United States Patent
Tang et al.

(10) Patent No.: US 12,049,010 B2
(45) Date of Patent: Jul. 30, 2024

(54) TRAJECTORY OPTIMIZATION USING NEURAL NETWORKS

(71) Applicant: Embodied Intelligence Inc., Emeryville, CA (US)

(72) Inventors: Haoran Tang, Emeryville, CA (US); Xi Chen, Emeryville, CA (US); Yan Duan, Emeryville, CA (US); Nikhil Mishra, Irvine, CA (US); Shiyao Wu, Emeryville, CA (US); Maximilian Sieb, Emeryville, CA (US); Yide Shentu, Berkeley, CA (US)

(73) Assignee: Embodied Intelligence Inc., Emeryville, CA (US)

( * ) Notice: Subject to any disclaimer, the term of this patent is extended or adjusted under 35 U.S.C. 154(b) by 324 days.

(21) Appl. No.: 17/193,870

(22) Filed: Mar. 5, 2021

(65) Prior Publication Data
US 2021/0276188 A1  Sep. 9, 2021

Related U.S. Application Data

(60) Provisional application No. 62/985,978, filed on Mar. 6, 2020.

(51) Int. Cl.
*B25J 9/16* (2006.01)
*B25J 5/00* (2006.01)
(Continued)

(52) U.S. Cl.
CPC .......... *B25J 9/1666* (2013.01); *B25J 9/1605* (2013.01); *B25J 9/163* (2013.01); *B65G 61/00* (2013.01);
(Continued)

(58) Field of Classification Search
CPC .......... B25J 9/1664; B25J 9/161; B25J 9/163; G05B 2219/40499; G05B 2219/40519;
(Continued)

(56) References Cited

U.S. PATENT DOCUMENTS 10,807,233 B2 * 10/2020 Dani ...................... G06V 40/28
11,188,821 B1 * 11/2021 Kalakrishnan ......... G06N 3/063
(Continued)

FOREIGN PATENT DOCUMENTS

JP   2018-202550   12/2018

OTHER PUBLICATIONS

IEEE International Conference on Robotics and Automation on May 21-25, 2018; Title: "Hybrid probabilistic trajectory optimization using null-space exploration" by ("Huang") (Year: 2018).*
(Continued)

*Primary Examiner* — Abby Y Lin
*Assistant Examiner* — Sohana Tanju Khayer (57) ABSTRACT

Various embodiments of the technology described herein generally relate to systems and methods for trajectory optimization with machine learning techniques. More specifically, certain embodiments relate to using neural networks to quickly predict optimized robotic arm trajectories in a variety of scenarios. Systems and methods described herein use deep neural networks to quickly predict optimized robotic arm trajectories according to certain constraints. Optimization, in accordance with some embodiments of the present technology, may include optimizing trajectory geometry and dynamics while satisfying a number of constraints, including staying collision-free and minimizing the time it takes to complete the task.

20 Claims, 8 Drawing Sheets

(51) Int. Cl.
*B65G 61/00* (2006.01)
*G05D 1/00* (2006.01)

(52) U.S. Cl.
CPC .............. *B25J 5/007* (2013.01); *B25J 9/1697* (2013.01); *G05D 1/0088* (2013.01)

(58) Field of Classification Search
CPC .......... G06N 3/042; G06N 5/01; G06N 3/045; G06N 5/045; G06N 3/08
See application file for complete search history.

(56) References Cited

U.S. PATENT DOCUMENTS

| | | | | |
|---|---|---|---|---|
| 2014/0201723 | A1* | 7/2014 | Kapinski | G05B 13/02 |
| | | | | 717/135 |
| 2014/0257558 | A1* | 9/2014 | Frische | B25J 9/1664 |
| | | | | 700/245 |
| 2016/0167228 | A1 | 6/2016 | Wellman et al. | |
| 2018/0107175 | A1* | 4/2018 | Ha | G05B 11/01 |
| 2019/0240833 | A1* | 8/2019 | Kimura | B25J 9/1664 |
| 2019/0379595 | A1* | 12/2019 | Ur | G06N 3/08 |
| 2020/0114506 | A1* | 4/2020 | Toshev | G06N 3/008 |
| 2020/0174490 | A1 | 6/2020 | Ogale et al. | |
| 2021/0158162 | A1 | 5/2021 | Hafner et al. | |
| 2021/0253128 | A1* | 8/2021 | Nister | G06N 3/08 |

OTHER PUBLICATIONS

ArXiv publication on Dec. 7, 2018; Title: "ChauffeurNet: Learning to drive by imitating the best and synthesizing the worst", by ("Bansal") (Year: 2018).*

IEEE/RSJ International conference on intelligent robots and systems (IROS) on Oct. 1-5, 2018; title: "Map based deep imitation learning for obstacle avoidance" by ("Liu") (Year: 2018).*

ARXIV.org publication of Cornell University library, on Jul. 2, 2019; Title: "Time-optimal path tracking for industrial robot: A model-free reinforcement approach" by ("Xiao") (Year: 2019).*

IEEE/RSJ International Conference on Intelligent Robots and Systems (IROS), Nov. 4-8, 2019; title: "Trajectory optimization for unknown constrained systems using reinforcement learning", by ("Ota") (Year: 2019).*

De Momi, et al.; A Neural Network-Based Approach for Trajectory Planning in Robot-Human Handover Tasks; Frontiers in Robotics and AI, Jun. 2016, vol. 3, Article 34; 10 pages.

Dubey, et al.; Task Time Optimization of a Robot Manipulator using Artificial Neural Network and Genetic Algorithm; International Journal of Computer Applications (0975-8887); vol. 51—No. 13, Aug. 2012; 8 pages.

Iriondo, et al.; Pick and Place Operations in Logistics Using a Mobile Manipulator Controlled with Deep Reinforcement Learning; Appl. Sci. 2019; 19 pages.

International Search Report and Written Opinion for PCT Application No. PCT/US2021/021183, filed Mar. 5, 2021; 12 pages.

Ota, Kei, et al.; Trajectory Optimization for Unknown Constrained Systems using Reinforcement Learning; arxiv.org, Cornell University Library, Mar. 14, 2019; 8 pages.

Xioa; Jiadong, et al.; Time-optimal Path Tracking for Industrial Robot: A Model-free Reinforcement Approach; arxiv.org, Cornell University Library, Jul. 2, 2019; 22 pages.

Bansal, et al.; Learning To Drive by Imitating the Best and Synthesizing the Worst; ChauffeurNet; 20 pages.

Huang, et al.; Hybrid Probabilistic Trajectory Optimization Using Null-Space Exploration; 2018 IEEE Conference; May 21-25, 2018; 7 pages.

Liu, et al.; Map-based Deep Imitation Learning for Obstacle Avoidance; 2018 IEEE Conference; Oct. 1-5, 2018; 6 pages.

* cited by examiner

TRAJECTORY OPTIMIZATION USING NEURAL NETWORKS

CROSS-REFERENCE TO RELATED APPLICATIONS

This application is related to and claims priority to U.S. Provisional Patent Application No. 62/985,978, entitled "TRAJECTORY OPTIMIZATION USING NEURAL NETWORKS," filed on Mar. 6, 2020, which is incorporated by reference herein in its entirety.

BACKGROUND

Machine learning techniques can use patterns and inferences to perform tasks without explicit instructions. Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network during which the neural network uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

Many tasks require the ability of a machine to sense or perceive it environment and apply knowledge about its environment to future decisions. Machines programmed solely to repeat a task or action, encounter issues or frequently get stuck, often requiring human intervention too frequently to increase productivity or efficiency. Robotic devices and other machines are often guided with some degree of computer vision.

Computer vision techniques enable a system to gain insight into its environment based on digital images, videos, scans, and similar visual mechanisms. High-level vision systems are necessary for a machine to accurately acquire, process, and analyze data from the real world. Computer vision and machine learning methods allow a machine to receive input and generate output based on the input. Some machine learning techniques utilize deep artificial neural networks having one or more hidden layers for performing a series of calculations leading to the output. In many present-day applications, convolutional neural networks are used for processing images as input and generating a form of output or making decisions based on the output.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the technology described herein generally relate to systems and methods for trajectory optimization with machine learning techniques. More specifically, certain embodiments relate to using neural networks to quickly predict optimized robotic arm trajectories in a variety of scenarios. In an embodiment of the present technology, a trajectory optimization method for a robotic system comprises identifying a task for the robotic system, wherein the task comprises one or more requirements, and providing one or more details related to the task and one or more details related to the robotic system to a machine learning model. The machine learning model determines an optimal trajectory for the robotic system to follow when performing the task wherein the optimal trajectory satisfies the one or more requirements and minimizes an amount of time it takes the robotic system to successfully complete the task. The method further comprises receiving an output from the machine learning model, wherein the output comprises the optimal trajectory, and directing the robotic system to complete the task via the optimal trajectory.

In some embodiments, the machine learning model comprises one or more deep artificial neural nets. The machine learning model may be trained using one or more of reinforcement learning and imitation learning. In certain embodiments, the details related to the task include at least: information related to kinematics and geometry of the robotic system, a start of the trajectory, and an end of the trajectory. The one or more requirements may include at least: the robotic system does not collide with any objects, motion of the robotic system is smooth throughout the optimal trajectory, velocity of the robotic system remain below a maximum velocity, and acceleration of the robotic system remain below a maximum acceleration. The robotic system may comprise one or more of: a robotic arm, a wheeled robot, and a self-driving car, or another robotic system. In certain embodiments, the robotic system comprises a robotic arm and the task comprises picking up an item and moving the item to a new location.

In another embodiment, a system comprises one or more computer-readable storage media, a processing system operatively coupled to the one or more computer-readable storage media, and program instructions, stored on the one or more computer-readable storage media. The program instructions, when read and executed by the processing system, direct the processing system to identify a task for a robotic system, wherein the task comprises one or more requirements, and provide one or more details related to the task and one or more details related to the robotic system to a machine learning model. The machine learning model determines an optimal trajectory for the robotic system to follow when performing the task wherein the optimal trajectory satisfies the one or more requirements and minimizes an amount of time it takes the robotic system to successfully complete the task. The program instructions, when read and executed by the processing system, further direct the processing system to receive an output from the machine learning model, wherein the output comprises the optimal trajectory, and direct the robotic system to complete the task via the optimal trajectory.

In yet another embodiment, one or more computer-readable storage media have program instructions stored thereon to predict optimal trajectories. The program instructions, when read and executed by a processing system, direct the processing system to at least identify a task for a robotic system, wherein the task comprises one or more requirements, and provide one or more details related to the task and one or more details related to the robotic system to a machine learning model. The machine learning model determines an optimal trajectory for the robotic system to follow when performing the task wherein the optimal trajectory satisfies the one or more requirements and minimizes an amount of time it takes the robotic system to successfully complete the task. The program instructions, when read and executed by the processing system, further direct the processing system to receive an output from the machine learning model, wherein the output comprises the optimal trajectory, and direct the robotic system to complete the task via the optimal trajectory.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Trajectory optimization can be used to enhance robotic motion and, in some examples, minimize the time a robot spends on travel in addition to optimizing or satisfying other requirements or restrictions for a given scenario. Optimization may be used to minimize time elapsed during travel in addition to reducing chances for error. In the example of a robotic picking environment wherein a robotic device is used to pick and place items, trajectory optimization may be used to reduce the chance of dropping an object by losing grip or suction stability creating smooth paths and reducing jerky movements, in addition to optimizing other parameters. Furthermore, optimizing the trajectories of a robot when picking and placing objects can increase the number of picks a robot can complete in a given time period and reduce the amount of time spent fixing errors due to issues like dropping or collisions.

Traditional trajectories often use handcrafted waypoints, causing slow and jerky movements, which in turn may cause instability or loss of suction or grip, as just a couple of examples. These handcrafted waypoints are a suboptimal method for generating trajectories and cannot adapt to variable scenarios. However, using machine learning techniques allows a system to output optimized trajectories for any scenario quickly and at runtime. Generally, trajectory optimization approaches use closed form classical approaches that require a lot of mathematical computation at each timestep. Traditional trajectory optimization methods often use rapidly exploring random tree (RRT) methods to find a geometrically collision-free path and then reparametrize the path to minimize time and satisfy kinematic constraints. This approach is also suboptimal since the quality of the path found by RRT limits the ability to find a time-optimal path afterwards. However, a trajectory optimizer that utilizes neural networks to process information and produce optimal paths can handle time-optimization, kinematic constraints, collision constraints, and suction constraints at the same time, therefore yielding faster and more reliable trajectories.

Thus, various embodiments of the technology described herein generally relate to systems and methods for trajectory optimization with machine learning techniques. More specifically, certain embodiments relate to using neural networks to quickly predict optimized robotic arm trajectories in a variety of scenarios. In some of these scenarios, an object may be attached to the robotic arm, such as in a robotic picking and placing scenario. In some examples, objects are attached to the robotic arm via a suction mechanism or a gripping mechanism. A neural network optimized trajectory provides for fast and smooth trajectories while maintaining stable suction or grip. In order for a robotic arm to operate at high speeds while being able to handle a variety a scenarios, trajectories must be optimized very quickly. A neural network model is used in the present disclosure to satisfy the speed requirement. A neural network in accordance with the present technology can quickly verify and adapt to scenarios.

Systems and methods described herein use deep neural networks (DNNs) to quickly predict optimized robotic arm trajectories according to certain constraints. Optimization, in accordance with some embodiments of the present technology, may include optimizing or satisfying a number of requirements, including staying collision-free. Optimization may apply to reducing time, reducing distance, reducing jerk, maintaining high suction stability, maintaining high grip stability, reducing linear friction, reducing torsional friction, reducing forces, reducing torques, and variations or combinations thereof. In some examples, optimization may be used to optimize a plurality of parameters such as the parameters listed. In other examples, optimization may be used to optimize a single parameter, such as time, while adhering to requirements regarding other parameters, such as staying below known limits for torques, forces, jerk, friction, and stability. Constraints that may apply to some scenarios discussed herein include: no collision, fixed starting point, fixed end point, smooth start and end, linear and rotational velocity bounds, and linear and rotational acceleration bounds. One or more DNNs may be used in accordance with the present technology to produce collision-free trajectories (i.e., no collisions with other objects and no self-collisions) that satisfy these kinematic constraints while minimizing time.

Artificial neural networks, such as those that may be implemented within embodiments related to trajectory optimization, robotic motion control, computer vision, and similar models described herein, are used to learn mapping functions from inputs to outputs. Generating mapping functions is done through neural network training processes. Many various types of training and machine learning methods presently exist and are commonly used including supervised learning, unsupervised learning, reinforcement learning, imitation learning, and many more. During training, the weights in a neural network are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period is over.

Parameters of a neural network are found using optimization with many, or sometimes infinite, possible solutions. Modern deep learning models, especially for computer vision and image processing, are based on convolutional neural networks, although they may also incorporate other deep generative models. As described herein, artificial neural networks for trajectory optimization, computer vision, robotic motion control, and other processes described herein first require training. A variety of different training methods may be used to train a neural network for the scenarios described herein in accordance with embodiments of the technology.

The present technology is primarily described herein in the context of robotic picking. However, it should be appreciated that the trajectory optimization methods discussed easily apply to a wide range of robotic system and/or artificial intelligence-based technology and scenarios. For example, systems and methods described herein may apply to serial robotic arms, parallel robotic arms, wheeled robots, self-driving vehicles, and many more robotic systems that may be entirely unrelated to the robotic arm context shown and discussed primarily herein.

Figure 1:
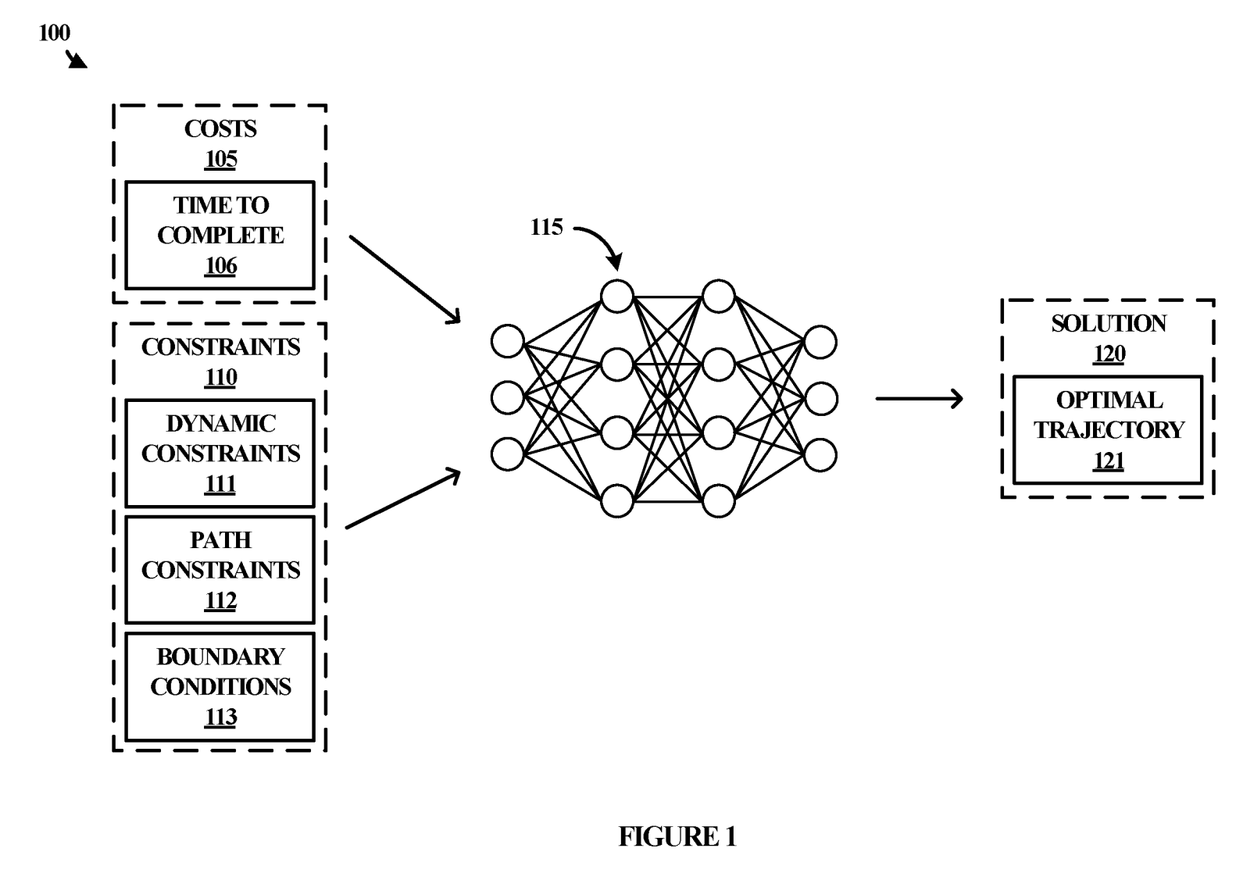
FIG. 1 illustrates a process for finding optimal trajectories in accordance with some embodiments of the present technology.

FIG. 1 illustrates a trajectory optimization process in accordance with some embodiments of the present technology. Trajectory optimization process 100 includes costs 105, constraints 110, DNN 115, and solution 120. Costs 105 includes time to complete 106. Constraints 110 include dynamic constraints 111, path constraints 112, and boundary conditions 113. Solution 120 comprises optimal trajectory 121. In accordance with the present technology, the trajectory optimization problem has only one cost—to minimize the time it takes to finish the trajectory. DNN 115 is responsible for minimizing costs 105 while adhering to constraints 110. The approach illustrated in FIG. 1 is advantageous over previous solutions in part because of the formulation of the trajectory optimization problem (i.e., there is only one cost to minimize). Constraints 110 may include kinematic constraints of the robot, no collisions or self-collisions, and suction or gripper stability.

In addition to the advantageous method for formulating the trajectory optimization problem, trajectory optimization process 100 provides an advantage over previous technology by including an improved trajectory optimizer, DNN 115. DNN 115 may simultaneously optimize both the geometry and the dynamics of a trajectory while also satisfying the requirements of constraints 110. Once DNN has found an optimal trajectory, it may output a solution. Solution 120 of the present example comprises optimal trajectory 121, in which the time to complete is minimized, the geometry and dynamics of the trajectory are optimized, and the constraints are satisfied.

Figure 2:
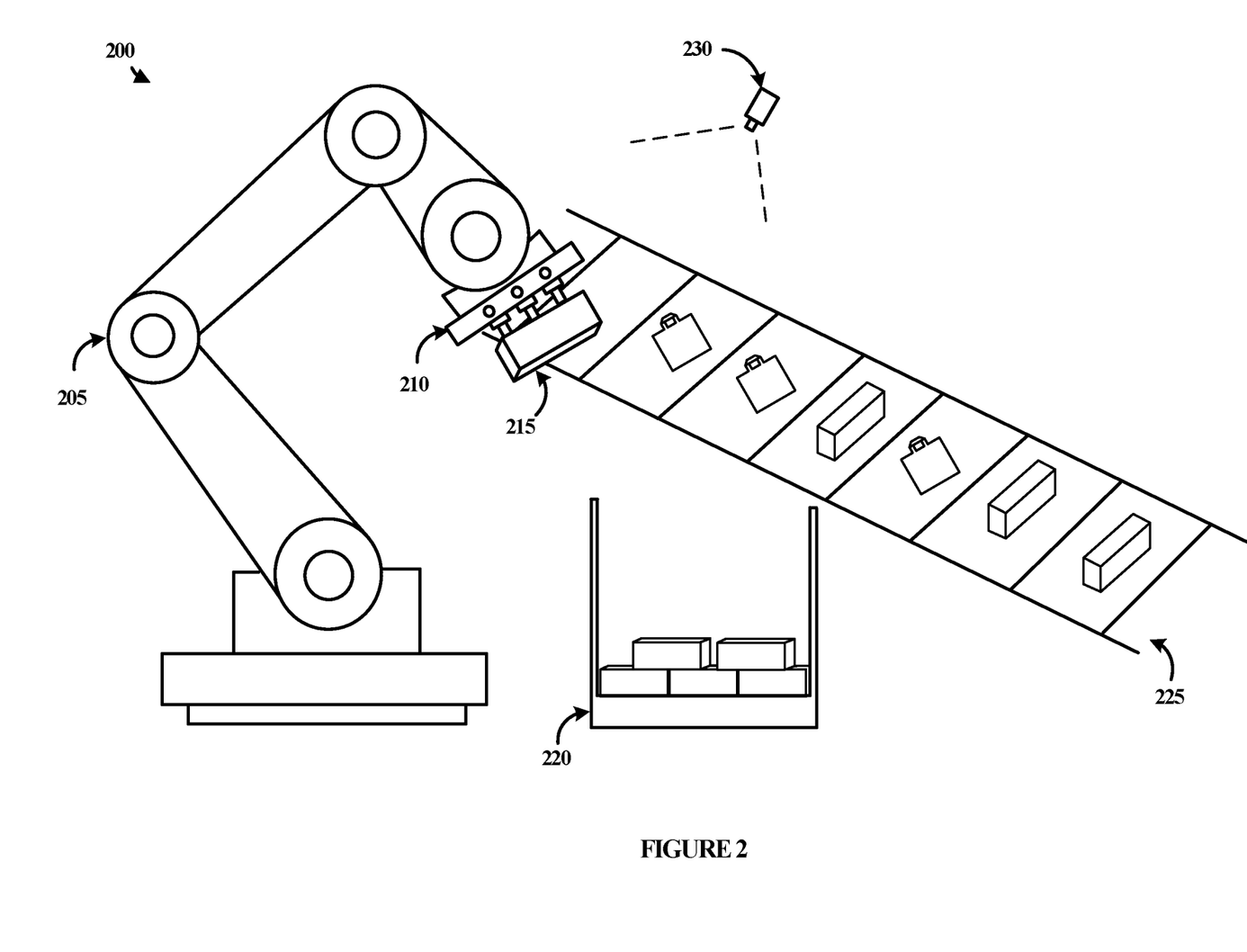
FIG. 2 illustrates robotic picking and place environment in accordance with some embodiments of the present technology.

FIG. 2 illustrates an example of a robotic motion environment in accordance with some embodiments of the present technology. Warehouse environment 200 includes robotic arm 205, bin 220, conveyor belt 225, and camera 230. Robotic arm comprises picking element 210 which includes a set of suction-based picking mechanisms that are being used to hold box 215. Bin 220 holds additional boxes, however any other types of items may be in a bin or similar container for picking in accordance with the present example. In the present example, robotic arm 205 is a six-degree-of-freedom (6DOF) robotic arm. Picking element 210 is designed for picking items out of bin 220 and placing them onto compartments of conveyor belt 225.

In some examples, robotic arm 205 is an autonomous robot including a means for recognizing the environment around it and process that information for coming up with ways to perform tasks. Thus, if a robotic arm 205 items out of bin 220, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of having a robot altogether, because humans may be required to frequently assist the robot.

In some examples, robotic arm 205 and picking element 210 may pick boxes from bin 220 one at a time according to orders received and place the items on conveyor belt 225 for packaging or place them into packages for shipment. Furthermore, robotic arm 205 and picking element 210 may be responsible for picking items from various locations other than bin 220. For example, several bins comprising different merchandise may be located in proximity to robotic arm

205, and robotic arm 205 may fulfill requests for the different pieces of merchandise by picking the correct type of merchandise and placing it onto conveyor belt 225. Picking element 210 may comprise one or more picking mechanisms for grabbing items in a bin. Picking mechanisms may include one or more suction mechanisms, gripping mechanisms, robotic hands, pinching mechanisms, magnets, or any other picking mechanisms that could be used in accordance with the present example.

In certain embodiments, determining which item to pick up and how to pick it up is determined using at least one DNN. A DNN may be trained to guide robotic motion such as item pick-up and determine which items have the greatest probabilities of pick-up success. In other embodiments, robotic motion may be guided by a program that does not use a DNN for decision making. Nonetheless, the robotic arm of the present example uses at least one DNN for trajectory optimization. A trajectory that may be optimized in accordance with the present example is the trajectory from a location where box 215 was picked up to a location on conveyor belt 225 where box 215 will be put down. Trajectory optimization may also be used between a pick and place cycle, such as for approaching a box in bin 220 before pick up or moving away from an object that was placed down.

A computer vision system in accordance with embodiments herein may comprise any number of visual instruments, such as cameras or scanners, in order to guide robotic motion, trajectory optimization, image processing, or similar processes. A computer vision system may receive visual information and provide it to a computing system for analysis. Based on the visual information provided by the computer vision system, the system can guide motions and actions taken by robotic arm 205 in the present example. A computer vision system may provide information that can be used to decipher geometries, material properties, distinct items (i.e., segmentation), bin boundaries, and other visual information related to picking items from a bin. Based on this information, the system may decide which item to attempt to pick up and can then use the computer vision system to guide robotic arm 205 to the item. A computer vision system may be in a variety of locations allowing it to properly view bin 220 and may be physically or communicatively coupled to robotic arm 205. In some examples, a computer vision system may be mounted to a component of robotic arm 205 from which it can view bin 220 or may be separate from the robotic device.

Figure 3:
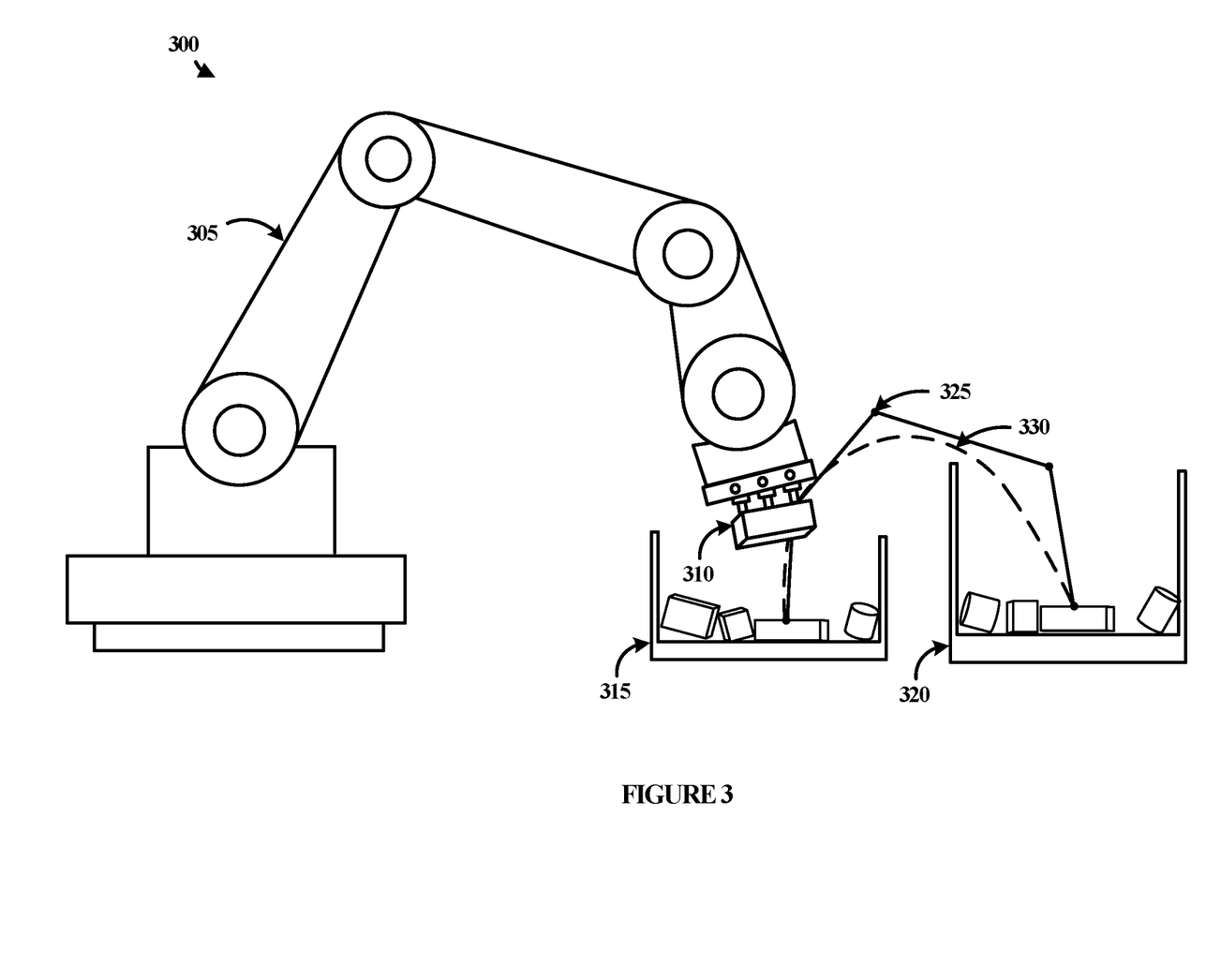
FIG. 3 illustrates a trajectory optimization environment in accordance with some embodiments of the present technology.

FIG. 3 illustrates trajectory optimization environment 300 in accordance with some embodiments of the present technology. Trajectory optimization environment 300 includes robotic arm 305, box 310, bin 315, and bin 320. In the present example, robotic arm 305 is moving box 310 from bin 315 to bin 320. Trajectory optimization environment 300 also includes trajectory 330 and trajectory 325. Trajectory 330 illustrates an example of an optimized trajectory and trajectory 335 illustrates an example of a traditional trajectory using handcrafted waypoints. Trajectory 325 may include any number of waypoints in accordance with the present example. Using handcrafted waypoints is a suboptimal method for generating robot trajectories.

In the present example, the waypoints of trajectory 325 cause robotic arm 305 to move in a slow, jerky manner that may lead to unstable suction or grip on box 310. Alternatively, trajectory 330 is the result of a trajectory optimization process in accordance with the present disclosure. Trajectory 330 was generated using one or more trajectory optimization DNNs responsible for minimizing time while adhering to a set of constraints. Trajectory 330 does not include any way points and follows a continuous, smooth path from bin 315 to 310. A continuous, smooth path such as trajectory 330 allows robotic arm 305 to move faster because it avoids jerky movements that could cause robotic arm 305 to drop box 310 or reduce suction stability below an accepted threshold. Jerky movements may also cause damage to objects that may be moved by robotic arm 305. In addition to being a geometrically and dynamically optimized path, trajectory 330 does not cause any collisions or self-collisions and maintains suction stability on box 310.

Figure 4:
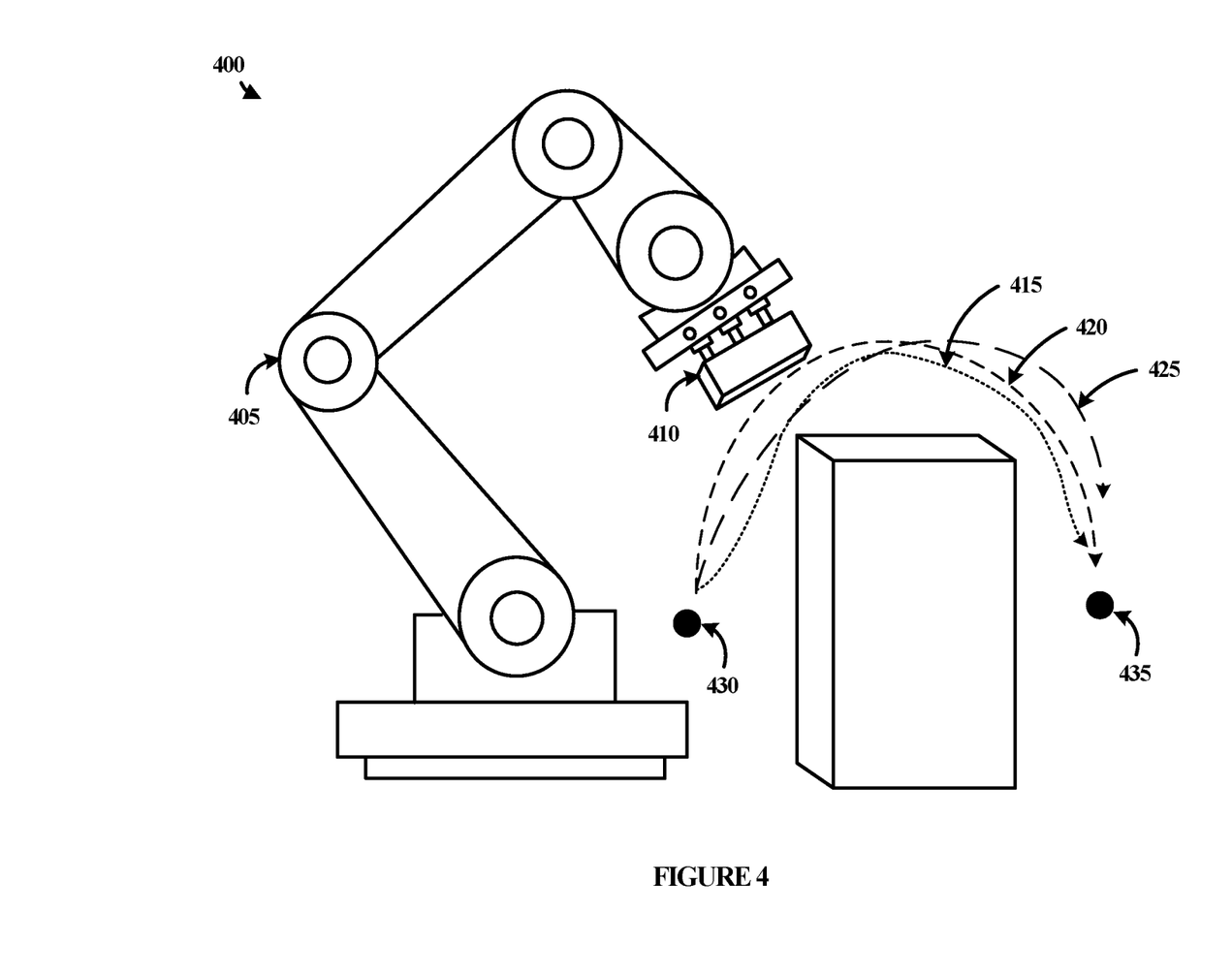
FIG. 4 illustrates a trajectory optimization example in accordance with some embodiments of the present technology.

FIG. 4 illustrates another trajectory optimization example for moving an object from one location to another with robotic arm 405. Trajectory optimization environment 400 includes robotic arm 405 which is holding box 410, trajectory 415, trajectory 420, and trajectory 425. Each of trajectory 415, trajectory 420, and trajectory 425 was predicted by one or more DNNs as a possible path from starting point 430 to end point 435.

In the present example, a trajectory optimization system including robotic arm 405 was set up with a subset of a task, wherein the subset of the task does not change based on the scenario. The subset of the task may include robotic arm 405, robot kinematics, robot joint geometry, gripper geometry, the suction cup geometries and specifications, and other details that may pertain to multiple scenarios similar to what is shown in FIG. 4. Once the trajectory optimization system is set up, the trajectory optimization system fills in the remaining details of the task during execution for a specific scenario. These details may include a starting point, an end point, the size of an object to be picked up, the relative position of the object, and similar details that may describe a particular scenario. Once these details are collected, the trajectory optimization system decides which trajectory the robot should follow from all of the possible options. Choosing a trajectory is performed by one or more DNNs in accordance with the present example. Once the trajectory is chosen, robotic arm 405 follows the trajectory.

Each of trajectory 415, trajectory 420, and trajectory 425 illustrates an example of a possible trajectory for robotic arm 405 to follow when moving box 410 from starting point 430 to end point 435. Using a trajectory optimization process that implements deep learning at described herein, the trajectory optimization system may choose one of trajectory 415, trajectory 420, and trajectory 425. There may be many more possible trajectories to choose from in the present example and in other examples. Only three trajectories are shown here for purposes of clarity.

Figure 5:
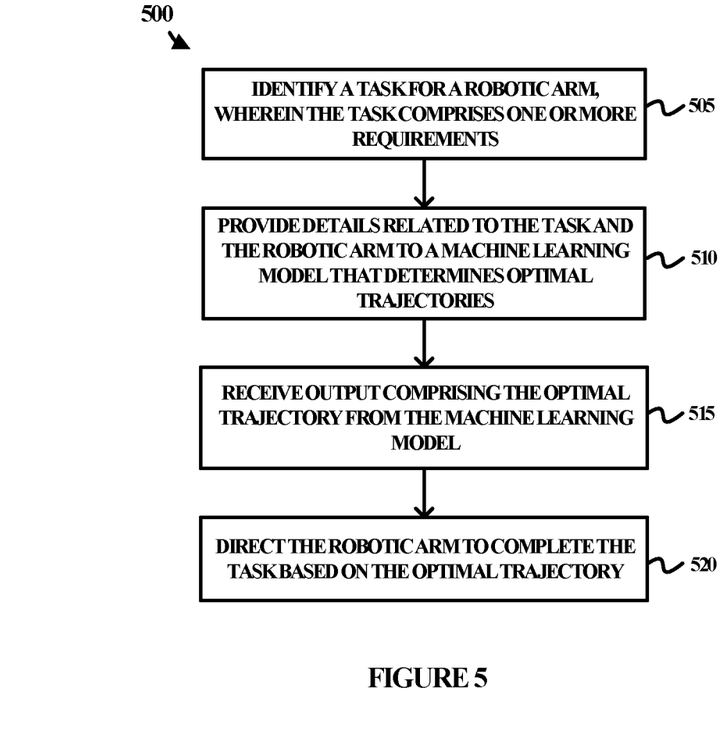
FIG. 5 is a flowchart illustrating a series of steps for optimizing robot trajectories in accordance with some embodiments of the present technology.

FIG. 5 show process 500 related to trajectory optimization for a robotic arm in accordance with some embodiments of the present technology. In step 505, a trajectory optimization system identifies a task for a robotic arm, wherein the task comprises one or more requirements. A task, as used in the present example, is used to describe a scenario related to a trajectory. For example, a task for a robotic arm may include kinematics for the robotic arm, joint geometry of the robotic arm, geometry for the gripper, suctions cups in use, objects being picked along with their size and relative position to the suction cups, the start of the trajectory, the end of the trajectory, and similar details that may be associated with the task. Requirements for the robotic arm may include: the robotic arm does not collide with any objects or itself, the motion of the robotic arm is smooth throughout the optimal trajectory, a set of velocity bounds for the robotic arm, and a set of acceleration bounds for the robotic arm, and similar requirements associated with the task.

In step 510, the trajectory optimization system provides details related to the task and the robotic arm to a machine learning model that is trained to determine optimal trajectories for the robotic arm. In some examples, the machine learning model is one or more DNNs. In step 515, the trajectory optimization system receives an output from the machine learning model comprising an optimal trajectory for the robotic arm to complete the task, wherein in optimizing the trajectory, the machine learning model minimized the time it takes to complete the task while making sure the constraints associated with the task are satisfied. In step 520, the trajectory optimization system directs the robotic arm to complete the task based on the optimal trajectory.

Figure 6:
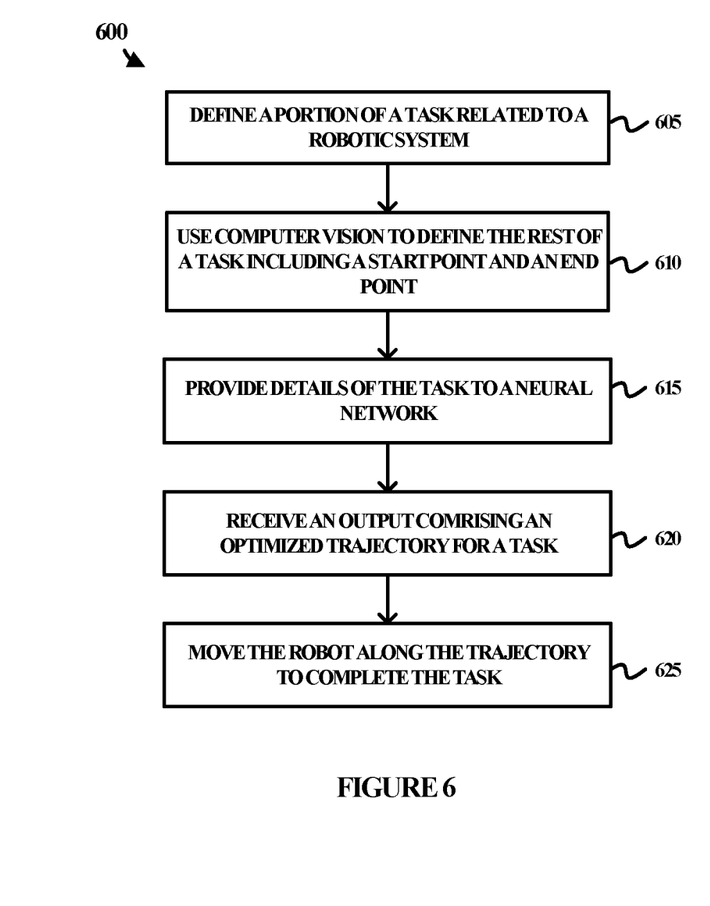
FIG. 6 is a flowchart illustrating a series of steps for optimizing robot trajectories in accordance with some embodiments of the present technology.

FIG. 6 illustrates process 600 for operating a robotic arm using trajectory optimization and computer vision. In step 605, a portion of a task related to a robotic system is defined. The portion of the task is defined based on the general robotic motion environment and may include details such kinematics for the robot, joint geometry for the robot, and similar details related to the environment. In step 610, a computer vision system is used to define the rest of the task including a start point and an end point. In step 615, the details of the task are provided to a neural network that chooses an optimal trajectory to complete the task. The optimal trajectory chosen by the neural network satisfies the constraints associated with the task, minimizes time, and optimizes both the geometry and dynamics of the trajectory at the same time. The outputted trajectory is then collision and self-collision free. In step 625, the robot then follows the trajectory to complete the task.

Figure 7:
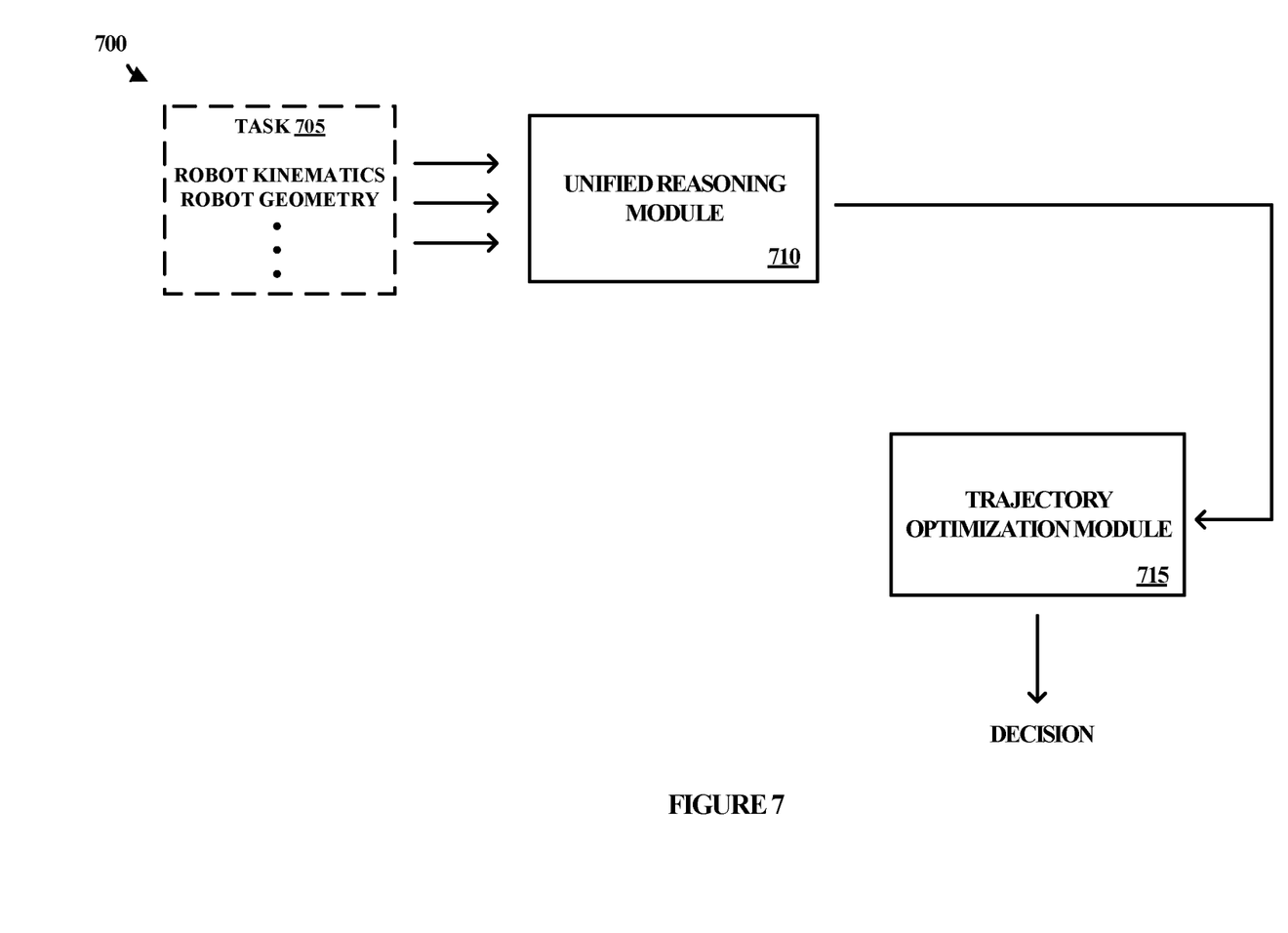
FIG. 7 illustrates a process for determining optimal trajectories for robotic devices in accordance with some embodiments of the present technology.

FIG. 7 illustrates an example of a trajectory optimization process in accordance with some embodiments of the present technology. Process 700 begins with a definition of task 705. Task 705 may be any task related to robotic motion that may benefit from trajectory optimization. Task 705 comprises at least robot kinematics and robot geometry, in addition to possible other details that may be defined at set up. The details of task 705 may be defined at different times (i.e., at setup of the robot and at beginning of the task) or may be defined at the same time. Nonetheless, once the first subset of details for task 705 is defined, the task may be provided to unified reasoning module 710. Unified reasoning module 710 may utilize one or more computer vision systems in some embodiments to collect details pertaining to the rest of task 705. Details collected may include a starting point, an end point, and other details related to the task and environment, such as obstacles between the starting point and the ending point. The details seen by the computer vision system are processed in unified reasoning module 710. In some examples, unified reasoning module comprises at least one DNN. In the present example, image analysis may include detecting boundary conditions, identifying an object to pick up, determining depth, performing segmentation, and other processes related to interpreting the environment around the robot.

The outputs of unified reasoning module may be used as input to trajectory optimization module 715 in some embodiments, which includes at least one DNN for performing trajectory optimization. Trajectory optimization module 715 receives the output of unified reasoning module 710 to choose an optimal trajectory. In some examples, the optimal trajectory chosen by trajectory optimization module 715 is a trajectory chosen from previous trajectories that are known to the DNN. In other examples, the DNN may use previous knowledge of optimized trajectories to generate a new trajectory. Nonetheless, once an optimal trajectory has been chosen by trajectory optimization module 715, a decision is output that may be used to control the robotic device associated with the task. The decision is a trajectory in which the geometry and kinematics are optimized, the time to complete the task is minimized, and the constraints of the task are satisfied.

The technology described herein should not be limited to robotic picking applications. The present technology has many applications in which a means for optimizing trajectories with neural networks is useful.

The processes described herein may be implemented in several different variations of media including software, hardware, firmware, and variations or combinations thereof. For example, methods of object correspondence and tracking described herein may be implemented in software, while a computing vision system or robotic picking device may be implemented entirely in hardware or a combination. Similarly, embodiments of the technology may be implemented with a trained neural net entirely in software on an external computing system or may be implemented as a combination of the two across one or more devices. The computer vision systems and tracking model herein may be implemented on various types of components including entirely software-based implementations, entirely hardware-based aspects, such as trained computer vision systems, or variations and combinations thereof.

Figure 8:
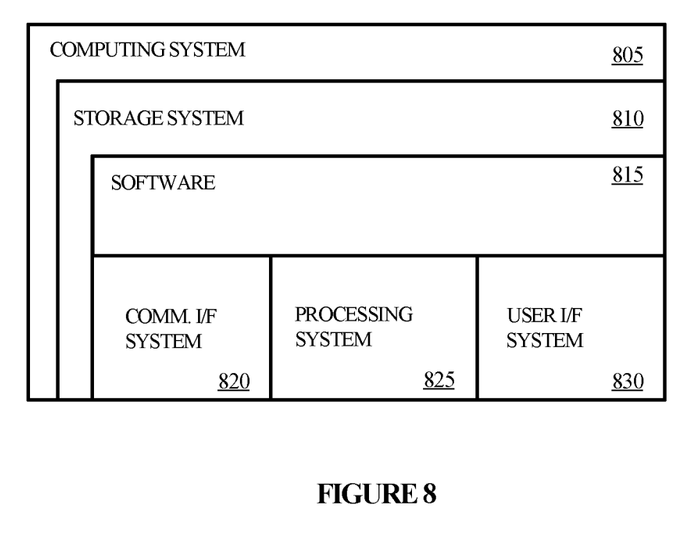
FIG. 8 is an example of a computing system in which some embodiments of the present technology may be utilized.

FIG. 8 illustrates computing system 805 that is representative of any system or collection of systems in which the various processes, programs, services, and scenarios disclosed herein may be implemented. Examples of computing system 805 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 805 may be implemented as a single apparatus, system, or device or may be implemented in a distributed manner as multiple apparatuses, systems, or devices. Computing system 805 may include, but is not limited to, storage system 810, software 815, communication interface system 820, processing system 825, and user interface system 830. Components of computing system 805 may be optional or excluded in certain implementations. Processing system 825 is operatively coupled with storage system 810, communication interface system 820, and user interface system 830, in the present example.

Processing system 825 loads and executes software 815 from storage system 810. Software 815 includes and implements various trajectory optimization processes described herein, which is representative of the methods discussed with respect to the preceding Figures. When executed by processing system 825, software 815 directs processing system 825 to operate for purposes of trajectory optimization as described herein for at least the various processes, operational scenarios, and sequences discussed in the foregoing implementations. Computing system 805 may optionally include additional devices, features, or functionality not discussed for purposes of brevity.

Referring still to FIG. 8, processing system 825 may comprise a micro-processor and other circuitry that retrieves and executes software 815 from storage system 810. Processing system 825 may be implemented within a single processing device but may also be distributed across multiple processing devices or sub-systems that cooperate in executing program instructions. Examples of processing system 825 include general purpose central processing units, graphical processing units, application specific processors, and logic devices, as well as any other type of processing device, combinations, or variations thereof.

Storage system 810 may comprise any computer readable storage media readable by processing system 825 and capable of storing software 815. Storage system 810 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 810 may also include computer readable communication media over which at least some of software 815 may be communicated internally or externally. Storage system 810 may be implemented as a single storage device but may also be implemented across multiple storage devices or sub-systems co-located or distributed relative to each other. Storage system 810 may comprise additional elements, such as a controller, capable of communicating with processing system 825 or possibly other systems.

Software 815 may be implemented in program instructions and among other functions may, when executed by processing system 825, direct processing system 825 to operate as described with respect to the various operational scenarios, sequences, and processes illustrated herein. For example, software 815 may include program instructions for implementing trajectory optimization processes, robotic control, computer vision processes, neural networks, decision making processes, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 815 may include additional processes, programs, or components, such as operating system software, modeling, robotic control software, computer vision software, virtualization software, or other application software. Software 815 may also comprise firmware or some other form of machine-readable processing instructions executable by processing system 825.

In general, software 815 may, when loaded into processing system 825 and executed, transform a suitable apparatus, system, or device (of which computing system 805 is representative) overall from a general-purpose computing system into a special-purpose computing system customized for one or more of the various operations or processes described herein. Indeed, encoding software 815 on storage system 810 may transform the physical structure of storage system 810. The specific transformation of the physical structure may depend on various factors in different implementations of this description. Examples of such factors may include, but are not limited to, the technology used to implement the storage media of storage system 810 and whether the computer-storage media are characterized as primary or secondary storage, as well as other factors.

For example, if the computer readable storage media are implemented as semiconductor-based memory, software 815 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 820 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 805 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A trajectory optimization method for a robotic system, the method comprising:
   identifying a task for the robotic system, wherein the task comprises one or more requirements;
   providing one or more details related to the task and one or more details related to the robotic system to a machine learning model, the machine learning model comprising a neural network trained to generate geometric trajectories for robotic systems that satisfy provided kinematic constraints and provided task constraints, wherein the machine learning model determines an optimal trajectory for the robotic system to follow when performing the task and wherein the optimal trajectory satisfies the one or more requirements and minimizes an amount of time it takes the robotic system to successfully complete the task, wherein:
      the one or more details related to the task comprise a starting point and an ending point, but not a trajectory between the starting point and the ending point; and
      the one or more details related to the robotic system comprise kinematics information and geometric information of the robotic system;
   receiving an output from the machine learning model, wherein the output comprises the optimal trajectory, the optimal trajectory comprising a geometric path selected by the machine learning model; and
   directing the robotic system to complete the task via the optimal trajectory.

2. The method of claim 1, wherein the one or more details of the task are determined based on imagery received from a computer vision system.

3. The method of claim 1, wherein the machine learning model is trained using one or more of reinforcement learning and imitation learning.

4. The method of claim 1, wherein the one or more details related to the task further comprise information about one or more obstacles between the starting point and the ending point.

5. The method of claim 1, wherein the one or more requirements include at least:
   the robotic system does not collide with any objects;
   motion of the robotic system is smooth throughout the optimal trajectory;
   velocity of the robotic system remain below a maximum velocity; and
   acceleration of the robotic system remain below a maximum acceleration.

6. The method of claim 1, wherein the robotic system comprises one or more of: a robotic arm, a wheeled robot, and a self-driving car.

7. The method of claim 1, wherein:
   the robotic system comprises a robotic arm; and
   the task comprises picking up an item and moving the item to a new location.

8. A system comprising:
one or more computer-readable storage media;
a processing system operatively coupled to the one or more computer-readable storage media; and
program instructions, stored on the one or more computer-readable storage media, wherein the program instructions, when read and executed by the processing system, direct the processing system to:
- identify a task for a robotic system, wherein the task comprises one or more requirements;
- provide one or more details related to the task and one or more details related to the robotic system to a machine learning model, the machine learning model comprising a neural network trained to generate geometric trajectories for robotic systems that satisfy provided kinematic constraints and provided task constraints, wherein the machine learning model determines an optimal trajectory for the robotic system to follow when performing the task and wherein the optimal trajectory satisfies the one or more requirements and minimizes an amount of time it takes the robotic system to successfully complete the task, wherein:
  - the one or more details related to the task comprise a starting point and an ending point, but not a trajectory between the starting point and the ending point; and
  - the one or more details related to the robotic system comprise kinematics information and geometric information of the robotic system;
- receive an output from the machine learning model, wherein the output comprises the optimal trajectory, the optimal trajectory comprising a geometric path selected by the machine learning model; and
- direct the robotic system to complete the task via the optimal trajectory.

9. The system of claim 8, wherein the one or more details of the task are determined based on imagery received from a computer vision system.

10. The system of claim 8, wherein the machine learning model is trained using one or more of reinforcement learning and imitation learning.

11. The system of claim 8, wherein the one or more details related to the task further comprise information about one or more obstacles between the starting point and the ending point.

12. The system of claim 8, wherein the one or more requirements include at least:
the robotic system does not collide with any objects;
motion of the robotic system is smooth throughout the optimal trajectory;
velocity of the robotic system remain below a maximum velocity; and
acceleration of the robotic system remain below a maximum acceleration.

13. The system of claim 8, wherein the robotic system comprises one or more of: a robotic arm, a wheeled robot, and a self-driving car.

14. The system of claim 8, wherein:
the robotic system comprises a robotic arm; and
the task comprises picking up an item and moving the item to a new location.

15. One or more computer-readable storage media having program instructions stored thereon to predict optimal trajectories, wherein the program instructions, when read and executed by a processing system, direct the processing system to at least:
- identify a task for a robotic system, wherein the task comprises one or more requirements;
- provide one or more details related to the task and one or more details related to the robotic system to a machine learning model, the machine learning model comprising a neural network trained to generate geometric trajectories for robotic systems that satisfy provided kinematic constraints and provided task constraints, wherein the machine learning model determines an optimal trajectory for the robotic system to follow when performing the task and wherein the optimal trajectory satisfies the one or more requirements and minimizes an amount of time it takes the robotic system to successfully complete the task, wherein:
  - the one or more details related to the task comprise a starting point and an ending point, but not a trajectory between the starting point and the ending point; and
  - the one or more details related to the robotic system comprise kinematics information and geometric information of the robotic system;
- receive an output from the machine learning model, wherein the output comprises the optimal trajectory, the optimal trajectory comprising a geometric path selected by the machine learning model; and
- direct the robotic system to complete the task via the optimal trajectory.

16. The one or more computer-readable storage media of claim 15, wherein the one or more details of the task are determined based on imagery received from a computer vision system.

17. The one or more computer-readable storage media of claim 15, wherein the machine learning model is trained using one or more of reinforcement learning and imitation learning.

18. The one or more computer-readable storage media of claim 15, wherein the one or more details related to the task further comprise information about one or more obstacles between the starting point and the ending point.

19. The one or more computer-readable storage media of claim 15, wherein the one or more requirements include at least:
the robotic system does not collide with any objects;
motion of the robotic system is smooth throughout the optimal trajectory;
velocity of the robotic system remain below a maximum velocity; and
acceleration of the robotic system remain below a maximum acceleration.

20. The one or more computer-readable storage media of claim 15, wherein the robotic system comprises one or more of: a robotic arm, a wheeled robot, and a self-driving car.

* * * * *